United States Patent [19]

Demazeau et al.

[11] 4,311,770
[45] Jan. 19, 1982

[54] NOVEL FERROMAGNETIC CHROMIUM DIOXIDE AND RHODIUM DIOXIDE MATERIAL AND ITS PREPARATION

[75] Inventors: Gérard Demazeau, Gradignan; Patrick Maestro, Le Bouscat; Théophile Plante, Merignac; Michel Pouchard, Pessac; Paul Hagenmuller, Talence, all of France

[73] Assignee: Agence Nationale de Valorisation de la Recherche (ANVAR), Neuilly sur Seine, France

[21] Appl. No.: 945,007

[22] Filed: Sep. 22, 1978

[30] Foreign Application Priority Data

Oct. 4, 1977 [FR] France ............................. 77 29857
Aug. 18, 1978 [FR] France ............................. 78 24192

[51] Int. Cl.$^3$ ............................................ C01G 37/027
[52] U.S. Cl. ............................ 428/694; 428/692; 252/62.51
[58] Field of Search .................. 252/62.51; 428/692, 428/696

[56] References Cited

U.S. PATENT DOCUMENTS

| | | | |
|---|---|---|---|
| 2,885,365 | 5/1959 | Oppegard | 252/62.51 |
| 3,034,988 | 5/1962 | Ingraham et al. | 252/62.51 |
| 3,278,263 | 10/1966 | Cox | 252/62.51 X |
| 3,875,297 | 4/1975 | Robbins | 252/62.51 X |
| 4,092,439 | 5/1978 | Demazeau et al. | 252/62.51 X |

FOREIGN PATENT DOCUMENTS 2138160 12/1972 France .
51-37096 3/1976 Japan .............................. 423/607

OTHER PUBLICATIONS

Haines, "IBM Tech. Disclosure Bull.", vol. 12, No. 5, pp. 676–677.
Muller et al., "J. of the Less Common Metals", 1968, 16, pp. 129–146.

*Primary Examiner*—Jack Cooper
*Attorney, Agent, or Firm*—Berman, Aisenberg & Platt

[57] ABSTRACT

Process for making a novel ferromagnetic chromium dioxide and rhodium dioxide material in the form of a solid solution $Cr_{1-x}Rh_xO_2$ where x is a number between 0 and 0.5.

It essentially comprises oxidation, under suitable conditions of temperature and pressure, of hydrated or anhydrous $Cr_2O_3$ or of a precursor of $Cr_2O_3$, in the presence of (1) an appropriate amount of a compound of rhodium III able to give $RhO_2$ under reaction conditions and (2) of an oxidizing agent consisting of an oxygenated compound free from metallic cations other than chromium and having, under the reaction conditions, a partial oxygen pressure at least equal to that corresponding, under the same conditions of temperature and pressure, to the equilibria $Cr_2O_3 + \frac{1}{2}O_2 \rightleftharpoons 2CrO_2$ and $Rh_2O_3 + \frac{1}{2}O_2 \rightleftharpoons 2RhO_2$ as well as eventually (3) of dilution water and/or of at least an additional doping agent acting as buffer in the reaction medium and/or a conventional modifying agent.

The invention is useful for the manufacture of a ferromagnetic material possessing improved magnetic characteristics.

59 Claims, No Drawings

NOVEL FERROMAGNETIC CHROMIUM DIOXIDE AND RHODIUM DIOXIDE MATERIAL AND ITS PREPARATION

The present invention relates to novel ferromagnetic materials and to their preparation. More particularly, it relates to a new ferromagnetic chromium dioxide and rhodium dioxide material, as well as to a process for obtaining same and to magnetic recording elements comprising this material as magnetic component, deposited on an appropriate substrate.

The chromium dioxide is one of the useful ferromagnetic compounds for a great variety of applications. For certain applications, notably those where only small decreases of magnetic characteristics have to be checked at high frequencies, it is necessary for the ferromagnetic material used to possess a high coercive field.

The development of audio and video recording processes had led to the investigation of higher and higher performing ferri- or ferromagnetic materials. For such applications, the materials used must have a high coercive field ($H_c > 300$ Oe) and a remanence ratio $\sigma r/\sigma s \geq 0.5$ (ratio of remanent magnetization to saturation magnetization) Thus, for about twenty years, many investigations have been directed towards chromium dioxide and aimed, on the one hand, to develop new processes for its production which could be easily put on an industrial scale and, on the other hand, to improve the physical and magnetic properties of this $CrO_2$.

The chromium dioxide of rutile structure is ferromagnetic at room temperature ($T_c \simeq 390°$ K.). Work of Shinji Umeki, Seitoku Saitoh and Yasuo Imaoka [IEEE Trans. Magn. 1974, Mag. 10 (3) 1965] has shown that $CrO_2$ effectively effected a clear advantage over other materials, such as $\gamma Fe_2O_3$, doped with cobalt for recording at high frequencies, especially in the field of video.

Then, the inventors devoted a great effort to research and development of original processes for producing $CrO_2$.

Thus, FR patent application 75 31 056 and the two FR patent applications for addition No. 76 29 472 and 77 28 690 attached thereto, disclose a novel process for obtaining $CrO_2$ and various possible embodiments thereof, by oxidation of $Cr_2O_3$, thoroughly specifying the role of the selected oxidizing agents and closely defining those leading to the best yields and to the morphology of microcrystallites best suited to the desired application. Therefore, it was clear that the oxidizing agent must be particularly free from metallic cations capable of forming chromates during the reaction process.

The preparation of $CrO_2$ was also disclosed in U.S. Pat. No. 3,278,263; however, the nature and the role of the oxidizing agents were so widely spread that it could not be of any help to those skilled in the art for selecting oxidising agents industrially useful in as much as it would be difficult to use on industrial scale two of the three oxidizing agents specifically described in this patent, whereas the third, i.e. $CrO_3$, causes the reaction to be no more strictly an oxidation; as a matter of fact, a substantial part of final $CrO_2$ derives from reduction of chromic anhydride. It should be noted that $CrO_3$ is hygroscopic, thereby resulting in difficulties in performing such a process, especially on an industrial scale.

Work from which the present invention derives dealt with a search of components capable of modifying the composition of the chromium dioxide and also of improving its physical properties, such as its magnetic properties and has led to preparing a new ferromagnetic material. These components are indifferently referred to as doping agents hereinafter or modifying agents.

Thus, processes for producing modified $CrO_2$ are now known which particularly involve doping agents in the form of oxides. In this connection, the following patents may be cited: U.S. Pat. Nos. 2,885,365, 2,923,683, 3,117,093, 3,243,260, 3,493,338 and 3,676,217, German patent application DE-OS No. 2 006 399, German patent application DE-AS No. 1,467,328, DE Pat. No. 1,152,932, NL patent application No. 64 08 515, BE Pat. No. 651,612, FR patent application No. 71 16 916 and FR Pat. Nos. 70 24 717, 70 38 388 and 71 01 160, which are included therein as references.

However, the reason for the selection of one doping agent rather than another was very badly defined and some reported results were inconsistent.

Therefore, the inventors undertook a considerable effort to clarify the role of doping agents in order to obtain a performing chromium dioxide or other materials having high magnetic characteristics. These efforts established that, for obtaining a high coercive field $H_c$ and a high remanence ratio $\sigma r/\sigma s$, the microcrystallites of ferromagnetic material must be magnetic monoareas, i.e. microcrystallites having sizes of approximately one micron. Furthermore, it is desirable, in order to decrease the demagnetizing field on the one hand and to promote the distribution on the magnetized substrate on the other hand, that these microcrystallites be of acicular form. It is now established that coercive field depends also on magnetic anisotropy of the material.

The numerous doping agents proposed according to the prior art herein-above referred to operate very differently; these doping agents act:

(1) as seeds for nucleation of $CrO_2$ within a source of chromium in the form of a solution, or (2) to orient crystallogenesis of $CrO_2$ and, in this case, doping agents are associated within a rutile or trirutile structure, or (3) to modify, notably to decrease the rate of growth of microcrystals of $CrO_2$, or (4) to modify the $CrO_2$ material by substitution in the lattice of chromium atoms by atoms or ions M magnetically anisotropic or causing important magnetic interactions M-Cr.

The first aspect (1) of the doping may be illustrated by German patent application De-OS No. 2,063,026 wherein it is stated that the production of carbon within a solution of $CrO_3$ promotes the germination of a very great number of microcrystals of $CrO_2$.

The second aspect (2) of the doping is encountered in the German patent applications DE-OS Nos. 2 001 383 and 2 124 812 and in the publication of Japanese Application JA No. 73 17 509, with nucleation and probably growth of $CrO_2$ on isostructural microcrystals of $CrO_2$ (rutile, trirutile, etc) pre-existent within the solution.

The third aspect (3) can be illustrated by the case of doping with sulfur, a well known element for reducing rates of growth of monocrystals.

The fourth aspect (4) can be illustrated by the case of the doping with iron where only 6% of iron can enter into the lattice according to E. HIROTA (Japan, Journal of Applied Physics, 9, 6, 1970, p. 647).

The dopings with iron, antimony, tellurium and tin have been exhaustively investigated by T. MIHARA et al. (Ferrites: Proceedings of the International Conference, July 1970, Japan).

Phase diagrams on page 478 of this reference clearly show that solid solutions $Cr_{1-x}Fe_xO_2$ and $Sn_{1-x}Cr_xO_2$ can only be observed in the case of iron and tin. The limit composition of the former solution is $Cr_{0.94}Fe_{0.06}O_2$, the latter is rich in tin ($x > \frac{2}{3}$), then probably not ferromagnetic. In the case of antimony, no solid solution forms or, according to some authors, a very restricted solid solution and the formation of $CrSbO_4$ of rutile structure would orient crystallogenesis of $CrO_2$ particles.

Similarly, B. KUBOTA et al (Journal of the American Ceramic Society, 46, 11,1963, p. 550) have shown (pages 554 and 555) that tellurium does not enter into the lattice of $CrO_2$. However, the conformation and the size of $CrO_2$ particles vary with percentage of tellurium added (see FIG. 3 of this reference).

In fact, some doping agents are only able to promote the formation of the greatest number of $CrO_2$ seeds at a given instant and, for these, the conversion of the source of chrome into $CrO_2$ must take place in solution. Most often, others can promote the formation of needles (or acicular particles) and/or increase the magnetic anisotropy. So true is it that investigations following the first ones, aiming modification of the characteristics of chromium dioxide by addition of unique modifying agents, dealt with more or less sophisticated combinations of modifying agents, qualified by some as primary and by others as secondary.

Furthermore, these doping agents should be generally introduced in the form of oxides in processes which comprise heat treating, under pressure and in the presence of water, of an oxygenated compound of chromium at a valency above IV, hence under low oxidizing conditions.

Therefore, it becomes clear that rhodium was not included and could hardly be included among the modifying agents of the prior art because rhodium dioxide $RhO_2$ which was recently isolated and known cannot be prepared or can be prepared only with difficulty at normal pressure; it could only be obtained recently under pressure of oxygen [see O. MULLER and R. ROY, Journal of the Less Common Metals, 1968, 16, pp. 129–146].

Reference to rhodium is only made in U.S. Pat. No. 3,022,186 and in the publication of FR patent application No. 74 00 199; however, rhodium appears then at degree $+III$ and is associated with another metal M, such as Sb, Nb, Ta or V, itself at degree $+V$, considered in this instance as major doping element of $CrO_2$, seeds of rutile structure and formula $RhMO_4$ are produced which, in fact, will promote nucleation of microcrystallites of $CrO_2$.

It has now been found according to the present invention that rhodium is a doping agent particularly preferred for $CrO_2$ and forms with it a continuous solid solution and that the new ferromagnetic compound based on chromium dioxide and rhodium dioxide prepared by the process according to the invention exhibits improved magnetic properties, as well as concerning pure $CrO_2$ as $CrO_2$ to which a doping agent other than rhodium is added. It has also been found that the novel compound according to the present invention can be doped with other conventional modifying agents and/or preferably with at least an additional doping agent acting as buffer in the reaction medium and thus exhibits still improved magnetic properties.

It is an object of the invention to provide a process for obtaining a ferromagnetic chromium dioxide and rhodium dioxide material in the form of a solid solution $Cr_{1-x}Rh_xO_2$, wherein x is a number between 0 and 0.5, preferably of at most 0.01, in which hydrated or anhydrous $Cr_2O_3$ or a precursor of $Cr_2O_3$ is oxidized, under suitable conditions of temperature and pressure, in the presence of (1) an appropriate amount of a rhodium III compound which will be able to give $RhO_2$ under the reaction conditions and (2) an oxidizing agent consisting of an oxygenated compound free from metallic cations other than chromium and not leading to preferential or parasitic formation of chromates, bichromates or of any other chromium compound with an oxidation number greater than $+IV$ and having, under the reaction conditions, a partial oxygen pressure at least equal to those corresponding, under same conditions of temperature and pressure, to the equilibria $Cr_2O_3 + \frac{1}{2}O_2 \rightleftharpoons 2\, CrO_2$ and $Rh_2O_3 + \frac{1}{2}O_2 \rightleftharpoons 2\, RhO_2$ and also eventually (3) dilution water and/or a conventional modifying agent.

It has also been found that a particularly advantageous embodiment of the present process comprises concomitant use of at least an additional doping agent as buffer of the reaction medium. It has indeed been established that better control of size and form of the resultant particles of $Cr_{1-x}Rh_xO_2$ (where $0 < X < 0.5$) and consequently of the obtention of a still improved solid solution $Cr_{1-x}Rh_xO_2$ can be achieved.

A further object of the present invention is to provide a process as defined above comprising additionally the concomitant use of at least an additional doping agent as buffer of the reaction medium.

A still further object of the invention is to provide the product itself consisting of a ferromagnetic chromium dioxide and rhodium dioxide compound in the form of a solid solution $Cr_{1-x}Rh_xO_2$ where x is a number between 0 and 0.5, preferably at most about 0.01 and more preferably of about 0.001.

In addition, it has been found that the novel ferromagnetic compound according to the invention exhibits physical and magnetic properties which make the product particularly suitable for use in magnetic recording elements, notably for audio or video recording, magnetic data storage, and the like.

Another object of the invention is to provide magnetic recording elements consisting of a substrate (notably tape, record, cylinder or torus) of non magnetic material comprising at least a magnetic track or a magnetic surface comprising a ferromagnetic composite material of chromium dioxide and rhodium dioxide according to the invention and, if necessary, a suitable binder.

Rhodium is a metal commonly considered as belonging to the metals of platinum group; however, rhodium IV possesses the electron structure $4d^5$ ($t_{2g}^5\, e_g^0$) different from that of neighbouring elements in the same valence state, i.e. ruthenium IV $4d^4$ or palladium IV $4d^6$. In the oxides, rhodium IV is characterized by a low spin because of the high value of the crystalline field $\Delta_c$. The invention makes use of the fact that rhodium IV possesses in that case a single electron and a significant magnetic anisotropy quite able to modify magnetic properties of chromium dioxide $CrO_2$. In the possible hypothesis of a load transfer, under certain conditions, within the solid solution $Cr_{1-x}Rh_xO_2(Cr^{4+} + Rh^{4+} \rightarrow Cr^{5+} + Rh^{3+})$ there is chromium V of electronic structure $t^1_{2g}\, Cg^o$ present therein which would have a magnetic anisotropy. Only after a careful study of the conditions of simultaneous existence of oxides $RhO_2$ and $CrO_2$, however not suggested by any of the prior art disclosures, it has been found that the oxide $RhO_2$ of rutile structure will produce a continuous solid solution with chromium dioxide $CrO_2$ and that this solid solution really constitutes a novel ferromagnetic compound which can be individualized in a well defined range. Thus, it should be born in mind that, contrary to the statement of R. D. Shannon & al (Journal of Physical Society of Japan, 31, 6, 1971, p. 1650), all dopings which might be attempted with the elements of structure $d^5$ should not lead to an increase of Curie temperature $T_c$. On the other hand, in the metallic oxides of iron and of iridium, respectively, $Fe^{3+}$ shows a strong spin $t_{2g}^3 \, e_g^2$, $Ir^{4+}$ probably has a low spin $(t_{2g}^5 e_g^0)$ and nevertheless no solid solution of $Cr_{1-x}Ir_xO_2$ type could so far be detected.

Then, rhodium appears as a novel element. Its mechanism of action on the chromium dioxide, resulting in the formation of a solid solution $Cr_{1-x}Rh_xO_2$ according to the invention, allows its differentiation from numerous elements formerly used as doping agents for $CrO_2$.

The compound according to the invention is obtained by a process essentially comprising the oxidation under suitable conditions of temperature and pressure, particularly at a temperature of at least 350° C., preferably from about 350° to 500° C. and under a pressure of at least 400 bars (1 bar = $10^5$ pascals), of hydrated or not hydrated $Cr_2O_3$ or a precursor thereof, in the presence of (1) an appropriate amount, preferably such as the ratio r of the mass of chromium in the chromium source to the mass of rhodium in the source of rhodium be approximately 5100 to 0.50, of a rhodium III compound which will give $RhO_2$ under the reaction conditions and (2) an oxidizing agent consisting of an oxygenated compound free from metallic cations other than chromium and not leading to preferential or parasitic formation of chromates, bichromates or of any other chromium compound with an oxidation number greater $+IV$ and having, under the reaction conditions, a partial oxygen pressure at least equal to those corresponding, under the same conditions of temperature and pressure, to the equilibria $Cr_2O_3 + \frac{1}{2}O_2 \rightleftarrows 2\,CrO_2$ and $Rh_2O_3 + \frac{1}{2}O_2 \rightleftarrows 2\,RhO_2$, also possibly in the presence of (3) dilution water and/or at least an additional doping agent as buffer of the reaction medium and/or at least a conventional modifying agent.

The starting material containing chromium, which is oxidized (according to the invention) together with the rhodium III compound (giving $RhO_2$ "in situ" under the reaction conditions), is, e.g., anhydrous $Cr_2O_3$, hydrated $Cr_2O_3$, i.e. in fact $Cr_2O_3 \cdot x''H_2O$ (wherein $x''$ is a number substantially in the range of from 1 to 6), and advantageously of finely-divided $Cr_2O_3$ previously obtained by thermal decomposition of $(NH_4)_2 Cr_2O_7$ at a low temperature.

The source of rhodium may notably and preferably consists of $Rh_2O_3 \cdot 5H_2O$ or $RhCl_3 \cdot 4H_2O$ (or of any other hydrates thereof). However, any rhodium compound able to convert into $RhO_2$ under the experimental conditions used is also suitable.

The ratio r of the mass of chromium in the starting material containing chromium to the mass of rhodium in the source of rhodium III is preferably between about 5100 and 0.50.

For further details concerning the oxidation reaction itself, reference can usefully be made to FR patent application for addition No. 77 28 690 of FR patent application No. 75 31 056 already previously mentioned. Wherein mention is made only of the starting chromium in this application, chromium III must not be considered alone but the total Cr III + Rh III.

Thus, oxidizing agents as set forth above which can be used in accordance with the present invention include, in particular, compounds of the formula $HXO_y \cdot zH_2O$ (where X is Cl or I, y is a positive integer below or equal to 3 and z a number representing the number of molecules of dilution of the water in said oxidizing agent if it only exists in solution, or the water of dilution and of crystallisation if it is in solid state, that is practically a number ranging from about 3 to 40) and more particularly $HClO_4 \cdot zH_2O$, $HIO_3$ and $HIO_4 \cdot 2H_2O$, and also $HBrO_3$, $NHO_3$, $NH_4ClO_4$ and $Cr(IO_3)_3 \cdot x' \, H_2O$ (where $x'$ is a number, varying normally from 0 to 8, representing the degree of hydration of chromium III iodate).

As a general rule, however, any oxidizing compound having sufficient oxidation power to oxidize, under the reaction conditions, CrIII to CrIV and RhIII to RhIV with appropriate kinetics, and free from metallic cations which may involve competitive parasitic reactions (such as formation of chromates) may also be suitable. By the term "appropriate kinetics", it should be understood that the oxidizing agent must almost simultaneously oxidize the chromium and rhodium up to degree $+IV$ so that formation of a solid solution is possible within a time consistent with an industrial process.

In a practical manner, the process conditions should be somewhat adjusted for each combination of source of chromium, source of rhodium III and oxidizing agent used; the one skilled in the art is quite able, in each specific case, to define the most suitable conditions by means of the following specification wherein the most interesting combinations for source of Cr/source of RhIII/oxidizing agent are enumerated and wherein the process conditions giving (from case to case) the best results are better specified.

In the process of the present invention, the temperature must be higher than about 350° C., preferably from about 350° to 500° C., whereas pressure will normally be of about 400 bars. These process conditions as well as the respective proportions of compound providing chromium, compound providing RhIII and oxidizing agent (which can also provide chromium) will be better specified in the present context, with reference to concrete but not limiting cases of combinations of source of chromium/source of RhIII/oxidizing agent.

Thus, a ferromagnetic solid solution $Cr_{1-x}Rh_xO_2$ can be prepared according to the present invention by oxidation of $Cr_2O_3 \cdot x''H_2O$ (wherein $x''$ is as previously defined) and $Rh_2O_3 \cdot 5H_2O$ (or $RhCl_3 \cdot 4H_2O$) with chromium III iodate $Cr(IO_3) \cdot x'H_2O$ (in which $x'$ may range from about 0 to 8). This iodate may be, for example, prepared by the method described by K. Nassau, J. W. Shiever and B. E. Prescott (Journal of Solid State Chemistry, 7; 186, 1973) which consists of adding iodic acid $HIO_3$ to a solution of chromium III nitrate $Cr(NO_3)_3$, then washing with water and optionally drying. The resulting iodate is coloured in green and more or less hydrated. $Cr_2O_3 \cdot x''H_2O$ and $Cr(IO_3)_3 \cdot x'H_2O$ are both solids, and it is preferred, notably to ensure good homogeneity of the reaction mixture, to add water. The $IO_3^-$ ion contained in the iodate is used for oxidation of chromium contained in the trivalent hydrated chromium oxide, of rhodium contained in the source of rhodium III and chromium contained in the iodate itself.

Outstanding results are achieved, on the one hand with a ratio $r_1$ of the total number of (Cr+Rh) atoms contained respectively in $Cr_2O_3 \cdot x''H_2O$ and in the source of RhIII to the number of Cr atoms contained in $Cr(IO_3)_3 \cdot x'H_2O$ ranging from about 5 to 6, on the other hand with a ratio $r_2$ of the mass of water added to the mass of iodate employed ranging from about 1.5 to 2. In a practical manner, the process is conducted at a temperature from about 490° to about 540° C. and under a pressure from 2400 to 4000 bars, advantageously of about 3000 bars. The product obtained under these conditions and after a reaction time of some hours in exclusively a continuous solid solution of the formula $Cr_{1-x}Rh_xO_2$.

Such a solid solution may also be obtained, essentially by oxidation of anhydrous $Cr_2O_3$ and $Rh_2O_3 \cdot 5H_2O$ (or $RhCl_3 \cdot 4H_2O$) at a temperature above 350° C. and under a pressure superior to about 400 bars, in a solid oxidizing medium or in a liquid aqueous solution, advantageously consisting of a compound $HClO_y \cdot zH_2O$ where y and z are as previously defined.

The chromium III oxide $Cr_2O_3$ in powdered form prepared by thermal decomposition ($\Delta Q$) of ammonium bichromate $(NH_4)_2Cr_2O_7$ is particularly suited to the use as a source of chromium in the process of the present invention.

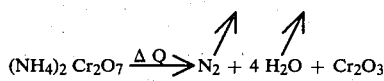

$$(NH_4)_2 Cr_2O_7 \xrightarrow{\Delta Q} N_2 + 4 H_2O + Cr_2O_3$$

In order to obtain very fine grains of $Cr_2O_3$ which, in turn, control the fineness of the resulting solid solution obtained according to the invention, any of the following processes can be used:

spraying of a solution of ammonium bichromate in a gas stream heated above 400° C., freeze-drying of a solution of ammonium bichromate, followed by thermal decomposition of the resulting fine particles;

mechanical grinding of solid ammonium bichromate and thermal decomposition of the powder thus obtained.

It has been found that the $Cr_2O_3$ thus prepared is transformed into $CrO_2$ in even slightly oxidizing solutions, such as aqueous solutions of perchloric acid $HClO_4$ containing only 10% by weight of pure acid, whereas an oxide $Cr_2O_3$ obtained by conventional industrial processes is less reactive.

On the other hand, since division of the starting materials facilitates its reactivity, the reaction times are relatively short, and notably ranging from 5 to 120 minutes, depending on experimental conditions. This shortness of reaction times does not allow the formation of coarse microcrystals; on the contrary, it results in formation of microcrystals of acicular form and small sizes. This is therefore a very advantageous embodiment of the process according to the invention.

The pressure and temperature used take a non-negligible part in the crystallogenesis of the resulting product. A pressure in the neighbourhood of 1000-2500 bars and a temperature from about 360° to 400° C. are well suited for achieving little monocrystals.

As a general rule, the concentration of the oxidizing solution is also particularly important. Solutions which are too concentrated also seem to promote fast crystal growth of the solid solution.

In the present case, the selection of oxidizing aqueous solutions of $HClO_4$ containing about 20 to 22% by weight of pure acid is advantageous and allows the obtention of microcrystals with the desired sizes, i.e. a length L from 1 to some microns.

The ratio $r_3$ of the mass of oxidizing solution used to the mass of the whole chromium contained in the $Cr_2O_3$ and rhodium contained in the source of RhIII is suitably above or at least equal to 1.4.

For calculating this ratio, the mass of acid at 33% by weight in the diluted solution must be taken into account as mass of oxidizing solution. A ratio $r_3$ near 1.5 is well suited for production of solid solutions $Cr_{1-x}Rh_xO_2$ with an excellent yield.

In a more concrete manner, it can be stated that, on work and laboratory scale, the reaction mixture consisting of anhydrous $Cr_2O_3$, $Rh_2O_3 \cdot 5H_2O$ or $RhCl_3 \cdot 4H_2O$ and the oxidizing solution, is placed in a tube of noble metal, for example gold, and then sealed. This tube is placed in a reaction vessel designed for internal or external heating and containing a fluid under pressure. On industrial scale, it is recommended to use a reaction vessel internally lined with a metal resistant to the oxidizing solution. After a reaction time, which varies according to the process conditions used, a solid product exclusively comprising a solid solution $Cr_{1-x}Rh_xO_2$, is obtained in the tube when the process is properly operated.

It has been found, no doubt because of the reactivity of the finely divided $Cr_2O_3$ obtained by thermal decomposition of ammonium bichromate, that the conversion into $CrO_2$ is effective in different oxidizing media, such as for the acids $HClO_y \cdot zH_2O$, where y and z are previously defined above, or $HBrO_3$, $HIO_3$, $HIO_4 \cdot 2H_2O$ and $HNO_3$.

According to one embodiment of the process of the invention where finely divided $Cr_2O_3$, previously prepared by thermal decomposition of $(NH_4)_2Cr_2O_7$ at low temperature is used, the ratio $r_3$ of the mass of oxidizing agent to the total of the mass of Cr contained in the ammonium bichromate and the mass of Rh contained in the source of RhIII should be preferably above or equal to 1.4 in the case of a solution of $HClO_4$ containing about 33% of pure acid or of a solution of $HBrO_3$ at 1/6, between 1 and 3 in the case of $HIO_3$, approximately equal to 3 in the case of $HIO_4 \cdot 2H_2O$ and greater than about 3 in the case of a solution of nitric acid $HNO_3$ at 1/3.

When the oxidizing agent is a solid, the mass of water suitably used is preferably about 1 to 3 times the mass of oxidizing agent.

According to a preferred mode of this embodiment of the invention, the reaction is carried out under a pressure higher than about 400 bars while maintaining the temperature approximately between 360° and 450° C.

In a concrete manner, the reaction mixture comprising finely-divided $Cr_2O_3$ previously prepared by thermal decomposition of ammonium bichromate at low temperature, the source of RhIII and an oxidizing solution according to the invention are placed in an unattackable tube, for example a gold tube, which is then sealed. Thereafter, the tube is placed in a heated (internally or externally) reaction vessel containing a fluid under pressure. Once the reaction is completed, the resulting product comprises when observed by electronic microscopy, in the form of black microcrystals of acicular form; the radiocrystallography analysis shows there is exclusively an unique phase of rutile structure consisting of a solid solution corresponding to the formula: $Cr_{1-x}Rh_xO_2$.

It should be pointed out that, according to this embodiment consisting of preparing the chromium dioxide from ammonium bichromate, the decrease of the dilution of the oxidizing solution was found to promote the formation of small microcrystals, thus imparting an increased intrinsic coercive field to the obtained solid solution.

Alternatively, it has been found that an appropriate perchlorate can be employed as oxidizing agent of the source of RhIII and $Cr_2O_3$ (hydrated or not) instead of the previously-contemplated oxidizing acids which are relatively corrosive. More specifically, it has been found that the considered solid solution could then be obtained, and the parasitic formations of chromates, bichromates or of any other chromium compound having an oxidation degree above +IV and any uncontrolled secondary doping are avoided by using, as oxidizing agent, ammonium perchlorate $NH_4ClO_4$ in the presence of water, if required. Indeed, it has been found that $NH_4ClO_4$ decomposes completely under the effect of temperature, under the reaction conditions, that is at a temperature higher than 350° C. and a pressure above about 500 bars.

The ratio $r_4$ of the mass of $NH_4ClO_4$ to the total mass of chromium contained in the oxide $Cr_2O_3$, hydrated or not, or in the ammonium bichromate $(NH_4)_2Cr_2O_7$ and Rh contained in the source of RhIII, is preferably above about 2.4. The mass of water which practically needs to be added when the source of chromium is $Cr_2O_3$ or $Cr_2O_3 \cdot x''H_2O$ is approximately equal to twice the mass of $NH_4ClO_4$.

In a particularly preferred mode of the process according to the invention as defined in any of its embodiments hereinabove described, it has also proved possible to divide by a factor of at least 10 the amount of rhodium used, compared to that previously recommended, whereas a final product is still obtained whose magnetic characteristics are as good as those of the product prepared in the same manner but without an additional doping agent as defined hereinafter. This represents a further advantage of the process of the invention, considering the high cost of rhodium, the incidence of which can be considerably reduced.

In a concrete manner, by "additional doping agent acting as buffer in the reaction medium" is meant any compound other than those taking part directly in the reaction and which shall be able, under the reaction conditions, to exert a buffer action according to the usual meaning in chemistry, that it should contribute to lower the acidity of the reaction medium down to an average pH value not very variable. It is preferred that such a compound be also able to adsorb on the forming crystals and slow down their growth. In the practice, boric acid $H_3BO_3$, oxalic acid COOH—COOH or any combination of these compounds were found the most suitable compounds in this connection.

The ratio of the mass of the additional doping agent of this kind to the mass of the oxidizing agent used in the reaction is preferably between about 0.03 and 0.60, more preferably around 0.13 concerning boric acid and in the particular case representing a preferred embodiment where the oxidizing agent is ammonium perchlorate $NH_4ClO_4$.

In a most particularly preferred embodiment of the process according to the invention, the additional doping agent comprises a combination of boric acid in the above mentioned proportion, compared to the oxidizing agent, and of oxalic acid in such a proportion that the ratio of the mass of oxalic acid to the mass of the oxidizing agent is between about 0.03 and 0.20, the latter being then essentially ammonium perchlorate $NH_4ClO_4$.

It should be noted that, though these additional doping agents are acids, the anions deriving therefrom in solution may in fact be considered as exerting a buffer action on the acidity of the medium.

In another more preferred embodiment of the process according to the invention, a further enhancement of the magnetic properties of $Cr_{1-x}Rh_xO_2$ formed may be achieved by adding, besides the aforesaid additional doping agents, one or more other modifying agents suitably selected from those known in the art, namely modifying elements selected, without being limiting, from Fe, Sb, Te, Sn or mixtures thereof.

This enhancement may be of two kinds:

either at the level of the magnetic anisotropy and, in that case, it is due to a doping agent entering in the lattice of rutile whose action is enhanced by the rhodium, or at the level of crystallogenesis and, in that case, it is due to an inhibitor or an orienting agent of the growth of microcrystallites, the action of which is still appreciably enhanced by the buffer effect exerted by the additional doping agent added according to the invention.

Proportions and amounts of these modifying elements eventually added may be very variable and are easily determined by those skilled in the art who in fact can fix them, in each specific case, according to the desired specifications.

In a general manner, the radiocrystallographic analysis of the product obtained by anyone of the embodiments of the process according to the invention shows the presence of an unique phase of rutile structure and a change of the parameters a and c of the elemental lattice as is indicated in the table I below; that is an excellent indication of the replacement of CrIV atoms by the larger ones of RhIV within the crystalline structure.

TABLE I

Evolution of parameters of the solid solution $Cr_{1-x}Rh_xO_2$ for some low x values (given with the measurement uncertainties more or less)

| x | a(Å) | c(Å) | c/a |
|---|---|---|---|
| 0 | 4.421 | 2.916 | 1.516 |
| 0.01 | 4.422 | 2.918 | 1.515 |
| 0.2 | 4.423 | 2.919 | 1.515 |
| 0.2 | 4.434 | 2.945 | 1.505 |
| 0.3 | 4.443 | 2.955 | 1.503 |

The formula of the solid solution according to the invention is $Cr_{1-x}Rh_xO_2$. Though it is possible, theoretically, to vary x from 0 up to 1 (in the case of a continuous solid solution), there is practically a limitation due to the evolution of Curie point of the ferromagnetic material as x increases. As shown by the table II hereinafter, the Curie temperature decreases rapidly with the increase of x.

This phenomenon can be explained by the fact that magnetic interactions between neighbouring atoms of CrIV in the crystalline lattice decrease as the atoms of RhIV replace those of CrIV. In fact, the ferromagnetic materials attractive for industrial applications shall exhibit a Curie temperature at least equal to about 25° C.

It has also been found that doping (or modification) with rhodium also results in modification of the crystallogenesis of the chromium dioxide, the crystal growth of $RhO_2$ being slower. Indeed, it is known in the prior art that the magnetic properties of a ferromagnetic material closely depend on the size of the constitutive microcrystallites. Therefore, the rhodium III leading to $RhO_2$ in situ according to the invention represents an outstanding modifying agent or doping agent in that it exerts also a favourable effect on the intrinsic coercive field of the resultant ferromagnetic product.

In addition, it has also been found in accordance with the invention that rhodium allows enhancement of the magnetic properties of samples of $CrO_2$ also doped with conventional elements, for example selected from those disclosed in the above-mentioned patents and applications. Although these additional doping agents may be, in principle, any common agent, they should be selected from those 1) able to orient or slow down the crystallogenesis of the material and/or 2) whose magnetic properties can be improved in the presence of rhodium. Thus, the coercive field of $CrO_2$ is already substantially improved by doping with antimony; however, it has been found that the addition in accordance with the invention, of even a small percentage of rhodium, unexpectedly enhances this increase of coercive field. This phenomenon was observed with other doping agents, such as for example tellurium, with which the rhodium exhibited a synergistic effect on the enhancement imparted to the ferromagnetic qualities of the ferromagnetic material obtained under the conditions of the process according to the invention.

The invention will be described in more detail hereinafter with reference to several illustrating examples, but by no means limiting.

TABLE II

Evolution of the Curie temperature in terms of x in the solid solution $Cr_{1-x}Rh_xO_2$ (given with the measurement uncertainties more or less)

| x | $T_C(°C.)$ |
|---|---|
| 0.00 | 122 |
| 0.01 | 121 |
| 0.03 | 118 |
| 0.2 | 110 |
| 0.3 | 101 |
| 0.4 | 85 |

EXAMPLE 1

A homogeneous mixture of 33.73 mg of $Cr_2O_3$ as a finely divided and screened powder and 0.77 mg of $Rh_2O_3 \cdot 5H_2O$ as well as 121.4 mg of a solution of perchloric acid at 1/5 (containing about 20% by weight of pure acid) was placed in a gold tube. The tube was sealed and placed in a reaction enclosure where it was exposed at a temperature of 390° C. and a pressure of 2,500 bars for 15 minutes. After opening of the tube, once the reaction is completed, exclusively a solid solution of formula $Cr_{0.99}Rh_{0.01}O_2$ was removed from the tube. The measured intrinsic coercive field gave a value of 430 oersteds whereas the remanent magnetization $\sigma_r$ amounted to 26.3 u.e. m/g and the ratio $\sigma r/\sigma s$ (remanent magnetization/saturation magnetization) was about 0.5.

EXAMPLE 2

The procedure of example 1 was basically followed except that the proportion of $Rh_2O_3 \cdot 5H_2O$ was varied and added in such a manner to get the final values of x respectively shown in the table III and by varying also the nature of the oxidizing agents and/or the process conditions. The data concerning each experiment thus realized as well, as the values for x and the intrinsic coercive field in each case, are enumerated in table III hereinafter.

EXAMPLE 3

A homogeneous mixture of 30.1 mg of $Cr_2O_3$, 0.7 mg of $Rh_2O_3 \cdot 5H_2O$ and 50 mg of $NH_4ClO_4$ was placed in a gold tube and there was added thereto 150 mg of dilution water.

On the other hand, 30.4 mg of $Cr_2O_3$, 0.07mg of $Rh_2O_3 \cdot 5H_2O$ and 50 mg of $NH_4ClO_4$ were mixed and introduced in a second tube, also with 150 mg of dilution water.

Both tubes were sealed and exposed to a pressure of 2,000 bars and a temperature of 350° C. for 10 minutes. After the reaction and the opening of the tubes, a solid solution of general formula $Cr_{0.99}Rh_{0.01}O_2$ exhibiting an intrinsic coercive field of 365 oersteds was collected in the first tube and a solid solution of general formula $Cr_{0.999}Rh_{0.001}O_2$ exhibiting an intrinsic coercive field of 310 oersteds was collected in the second tube.

The increase of the atomic percentage of rhodium seems to enhance the intrinsic coercive field of the resulting product; however, it can be concluded from table III of example 2 that the value $x \simeq 0.01$ corresponds virtually to a maximum of the value of intrinsic coercive field.

EXAMPLE 4

A homogeneous mixture of 49 mg of $Cr_2O_3$ and 1.1 mg of $Rh_2O_3 \cdot 5H_2O$ was placed in a gold tube in the presence of 146.5 mg of a solution of 1/5 perchloric acid. The tube was then sealed and exposed to a pressure of 2600 bars and a temperature of 375° C. for 30 minutes. After tempering, the tube was opened and an exclusive ferromagnetic solid solution of total composition $Cr_{0.99}Rh_{0.01}O_2$ exhibiting an intrinsic coercive field of 405 oersteds was collected.

EXAMPLE 5

A homogeneous reaction mixture consisting of 41.7 mg of $Cr_2O_3$ and 2.4 mg of $Rh_2O_3 \cdot 5H_2O$ was placed in a tube of unattackable metal (tube lined for example with an inner coat of gold) and 121 mg of a perchloric acid solution containing about 20% by weight of pure acid were added. The tube was sealed and exposed to a pressure of 1100 bars and a temperature of 380° C. for 1 hour, whereupon the tube was opened and a solid ferromagnetic phase of general formula $Cr_{0.975}Rh_{0.025}O_2$ exhibiting an intrinsic coercive field of 319 oersteds was removed therefrom.

EXAMPLE 6

1.9 mg of $RhCl_3 \cdot 4H_2O$, 50.2 mg of $Cr_2O_3$ and 145 mg of 1/5 perchloric acid (containing about 20% by weight of pure acid) were placed in a tube of unattackable metal (for example, gold). The tube was then sealed and introduced in a reaction enclosure under a pressure of 1600 bars and a temperature of about 400° C. for 5 minutes. The rise in temperature and in pressure has taken approximately 30 minutes. Once opened, the tube only contained a ferromagnetic material of formula $Cr_{0.99}Rh_{0.01}O_2$, exhibiting an intrinsic coercive field of 372 oersteds.

EXAMPLE 7

Dopings of $CrO_2$ according to the invention with both antimony and rhodium were carried out by following, in principle, the procedure of example 1, and for that, some experiments were performed the detail and results of which are summarized in the Table IV below.

In part A of Table IV are related tests carried out in the presence of 1/5 perchloric acid, the mass of oxidizing solution based on 33% of pure acid always representing about 1.4 times the mass of chromium contained in the oxide $Cr_2O_3$. The part B relates to the use, as oxidizing agent, of ammonium perchlorate in the proportions of 50 mg of $NH_4ClO_4$ per 100 mg of $H_2O$ and 30 mg of the mixture of Cr, Rh and Sb (added respectively in the form of anhydrous $Cr_2O_3$, $Rh_2O_3 \cdot 5H_2O$ and $Sb_2O_3$).

This Table IV shows very clearly that the rhodium enhances the intrinsic coercive field of doped $CrO_2$.

EXAMPLE 8

Similar tests to those of example 6 were conducted in order to determine the action of rhodium on $CrO_2$ doped with tellurium. The detail of process conditions and the results obtained are summarized in the table V hereinafter.

It can be seen again an enhancement (synergistic effect) provided by the rhodium on the intrinsic coercive field of chromium dioxide modified by tellurium. (introduced as $TeO_2$).

EXAMPLE 9

85 mg of ferromagnetic solid solution of general formula $Cr_{0.99}Rh_{0.01}O_2$, prepared according to the example 2 and having a coercive field of about 225 oersteds, were used. 0.1 mg of $TeO_2$ was added in such a manner that the ratio of the number of atoms of tellurium to the number of atoms of chromium was substantially of the order of 0.006. The reaction mixture of both solids was placed in a gold tube together with about 17 mg of an oxidizing solution in the form of 1/5 perchloric acid. The tube was then sealed and exposed to a pressure of 2,600 bars and a temperature near 380° C. for 30 minutes. After tempering and opening of the tube, a ferromagnetic material was obtained which exhibited an intrinsic coercive field of 290 oersteds.

EXAMPLE 10

12 mg of a ferromagnetic solid solution of general formula $Cr_{0.99}Rh_{0.01}O_2$, previously prepared as indicated in example 2 and having an intrinsic coercive field of about 207 oersteds, were used. Approximately 1 mg of antimony oxide $Sb_2O_3$ was added in such a manner that the atomic ratio Sb/Cr is nearly equal to 0.05. This reaction mixture was placed in a gold tube containing about 20 mg of oxidizing solution in the form of 1/5 perchloric acid $HClO_4$. The tube was then sealed and exposed to a pressure of 2,500 bars and a temperature of about 390° C. for 30 minutes. After tempering, the tube was opened and the resulting ferromagnetic material exhibited an intrinsic coercive field near 245 oersteds.

EXAMPLE 11

A mixture consisting of 50 mg of $NH_4ClO_4$, 30 mg of chromium sesquioxide $Cr_2O_3$ previously prepared by roasting of ammonium bichromate and 0.7 mg of $Rh_2O_3 \cdot 5H_2O$ was homogenized and placed in a gold tube, together with 150 mg of water. The tube was sealed and introduced in a reaction vessel where it was exposed to a pressure of 2,000 bars and a temperature of 380° C. The operation in sealed tube on the whole took about 60 minutes with a plateau of approximately 25 minutes at 380° C. After opening of the cooled tube, once the reaction complete, a product was obtained, consisting exclusively of a ferromagnetic material of the composition $Cr_{1-x}Rh_xO_2$, with $x=0.01$.

The coercive field of this material was about 370 Oe (oersteds).

EXAMPLE 12

There was placed in a gold tube a homogenized mixture of 50 mg of $Cr_2O_3$, 116 mg of $NH_4ClO_4$, 15 mg of $H_3BO_3$ and 0.1 mg of $Rh_2O_3 \cdot 5H_2O$ so that the level of rhodium was about 0.001, whereas the ratio of the mass of $NH_4ClO_4$ to the mass of $Cr_2O_3$ was near 1.5 and the ratio of the mass of $H_3BO_3$ to the mass of $NH_4ClO_4$ was approximately equal to 0.13. 130 mg of water were added to this mixture; the tube was sealed and placed in a reaction vessel where it was exposed to a pressure of 2,000 bars and a temperature of about 425° C. The total time of processing in sealed tube was about 1 hour and a half. After reaction and opening of the tube, an exclusive ferromagnetic material $Cr_{1-x}Rh_xO_2$ with $x=0.001$ was removed therefrom. The measured coercive field was equal to 475 Oe.

EXAMPLE 13

A homogeneous mixture was made with 0.05 mg of $Rh_2O_3 \cdot 5H_2O$, 25 mg of $Cr_2O_3$ obtained by roasting of $(NH_4)_2Cr_2O_7$ as a finely ground powder, 7.5 mg of boric acid $H_3BO_3$ and 56 mg of ammonium perchlorate $NH_4ClO_4$. This mixture was characterized by an atomic ratio of Rh to Cr of about 0.001, a ratio of the mass of $NH_4ClO_4$ to the mass of $Cr_2O_3$ of about 2.24 and a ratio of the mass of $H_3BO_3$ to the mass of $NH_4ClO_4$ of about 0.13.

This mixture was placed in a gold tube, 65 mg of water were added thereto and the tube was sealed, then exposed to a pressure of 2,000 bars and a temperature of 425° C. The total time elapsed between the beginning of the rise in temperature and the switch off of the heating was 90 minutes.

After cooling and opening of the tube, an exclusive ferromagnetic material of formula $Cr_{1-x}Rh_xO_2$ with $x=$ about 0.001 was collected.

The coercive field of this material was about 470 Oe.

EXAMPLE 14

A mixture $M_1$ was made whose composition was the following: 2.2 mg of $Rh_2O_3 \cdot 5H_2O$, 300 mg of $H_3BO_3$, 2.240 mg of $NH_4ClO_4$ and 1.000 mg of $Cr_2O_3$ (prepared by roasting of $(NH_4)_2Cr_2O_7$).

300 mg of this mixture, previously homogenized were taken off and 4.3 mg of iron oxalate, 3.6 mg of $SnO_2$ and 3.5 mg of $Sb_2O_3$ were added thereto. This mixture was again homogenized and placed in a gold tube together with 210 mg of water. The tube was then sealed and exposed to a pressure of 2,000 bars and a temperature of 420° C. for 60 minutes. The total time of the processing in sealed tube was 90 minutes, the third of which was required for reaching the temperature of 420° C. After quenching, the tube was opened and a product has been obtained consisting exclusively of a ferromagnetic material requiring no complex process of separation and whose coercive field was 504 Oe.

EXAMPLE 15

200 mg of the mixture defined in example 14 under the reference $M_1$, as well as 15 mg of $NH_4ClO_4$, 20 mg of oxalic acid, 10 mg of iron oxalate (i.e., 5% atomic of Fe), 10 mg of $Sb_2O_3$ (i.e., 8% atomic of Sb) and 150 mg of water were placed in a gold tube. The tube was sealed and placed in a reaction vessel. After a rise in temperature and in pressure of 60 minutes, both parameters were stabilized respectively at 420° C. and 2,000 bars and maintained at these values for 40 minutes. The tube was opened after a strong quenching under compensated pressure. The ferromagnetic material obtained, washed and dried exhibited a coercive field of 490 Oe.

EXAMPLE 16

48.5 mg of mixture $M_1$ as defined in example 14 were charged in a gold tube in the presence of 30.9 mg of water and 6.4 mg of additional $Cr_2O_3$, so as to reduce to 1.5 the ratio of the mass of $NH_4ClO_4$ to the mass of $Cr_2O_3$. The tube was sealed and maintained in a reaction vessel for 85 minutes, while keeping during 45 minutes a temperature of 420° C. and a pressure of 2,000 bars after causing the temperature and the pressure inside the vessel to rise up to these values. After quenching and opening of the tube, a product was collected consisting exclusively of a solid solution of formula $Cr_{1-x}Rh_xO_2$ where x=0.0007. This product showed a coercive field of 500 Oe.

EXAMPLE 17

Following the general procedure described in the above mentioned example 12, four experiments were carried out by varying each time some of the parameters or the reaction conditions, as indicated in the table VI below. The preparation with reference number "No. 2" in this table corresponds exactly to the example 11 hereinabove.

The results reported in this table set forth the effect provided by the additional doping agent. It should be noted in particular that coercive fields of neighbouring values (i.e. 370 Oe for No. 2 and 410 Oe for No. 3) can be obtained under process conditions substantially identical but with a rhodium level tenfold lower for the test No. 3. On the other hand, for the same level of rhodium (tests Nos. 1 and 3), a widely increased coercive field was obtained when $H_3BO_3$ was added in accordance with the present invention.

EXAMPLE 18

Still other experiments were performed following the general procedure of example 14 and varying each time the proportions and/or the nature of the conventional modifying agents eventually added, as well as, slightly, the reaction times as indicated in the table VII below.

Process conditions common to all these examples: level of rhodium: 0.1%; P=3,000 bars; T=420° C.

This series of tests shows clearly the advantages which may be attained with the various preferred embodiments of the process according to the invention.

EXAMPLE 19

A mixture M having the following composition was made:

50 mg of $Cr_2O_3$ obtained by roasting of $(NH_4)_2Cr_2O_7$,
125 mg of $NH_4ClO_4$
0.1 mg of $Rh_2O_3 \cdot 5H_2O$
3 mg of $Fe_2(SO_4)_3$
3.4 mg of $Sb_2O_3$ 6 mg of oxalic acid COOH-COOH, used as additional doping agent, was added to this mixture M.

The resulting mixture was placed in a tube in gold in presence of 125 mg of water.

After sealing, the tube was submitted to a pressure of about 2,000 bars and to a temperature of 430° C. for a total time of 60 minutes (including the rise in temperature).

After reaction, the product obtained was exclusively constituted by a ferromagnetic material of rutile structure having a coercive field of about 460 oersteds.

TABLE III

Evolution of the coercive field of chromium dioxide modified with rhodium in terms of doping level x

| Oxidizing agents | x | T (°C.) | P (bar) | Time (minutes) | Concentration C of aqueous $HClO_4$ | Coercive field (in oersteds) |
|---|---|---|---|---|---|---|
| $HClO_4$ | 0.0008 | 420 | 2600 | 85 | 1/5 | 111 |
| $HClO_4$ | 0.001 | 400 | 1200 | 20 | 1/5 | 124 |
| $HClO_4$ | 0.01 | 390 | 2100 | 30 | 1/5 | 389 |
| $HClO_4$ | 0.01 | 385 | 2200 | 60 | 1/5 | 402 |
| $HClO_4$ | 0.01 | 390 | 2300 | 55 | 1/5 | 425 |
| $HClO_4$ | 0.025 | 380 | 1160 | 60 | 1/5 | 319 |
| $HClO_4$ | 0.054 | 370 | 1400 | 40 | 1/5 | 283 |
| $NH_4ClO_4$ | 0.0001 | 410 | 3000 | 30 | | 180 |
| $NH_4ClO_4$ | 0.001 | 400 | 2000 | 30 | | 225 |
| $NH_4ClO_4$ | 0.005 | 400 | 3000 | 30 | | 279 |
| $NH_4ClO_4$ | 0.01 | 400 | 2000 | 30 | | 290 |
| $NH_4ClO_4$ | 0.01 | 360 | 2100 | 20 | | 370 |

TABLE IV

Synergistic effect in the case of a doping with antimony and rhodium

| atomic % Rh | atomic % Sb | T (°C.) | P (bar) | Time (minutes) | Concentration C of aqueous $HClO_4$ | Coercive field (in oersteds) |
|---|---|---|---|---|---|---|
| 0 | 0.001 | 470 | 1600 | 150 | 1/5 | 108 |

TABLE IV-continued
Synergistic effect in the case of a doping with antimony and rhodium

| | atomic % Rh | atomic % Sb | T (°C.) | P (bar) | Time (minutes) | Concentration C of aqueous HClO$_4$ | Coercive field (in oersteds) |
|---|---|---|---|---|---|---|---|
| A | 0.001 | 0 | 470 | 1600 | 150 | 1/5 | 72 |
|   | 0.001 | 0.001 | 470 | 1600 | 150 | 1/5 | 135 |
|   | 0.005 | 0 | 400 | 2000 | 100 |  | 198 |
| B | 0 | 0.005 | 400 | 2000 | 100 |  | 198 |
|   | 0.005 | 0.005 | 400 | 2000 | 100 |  | 243 |

TABLE V
Synergic effect in the case of a double doping with tellurium and rhodium

| | atomic % Rh | atomic % Te | T (°C.) | P (bar) | Time (minutes) | Concentration C of aqueous HClO$_4$ | Coercive field (in oersteds) |
|---|---|---|---|---|---|---|---|
|   | 0 | 0.01 | 460 | 1600 | 120 | 1/5 | 126 |
| A | 0.01 | 0 | 460 | 1600 | 120 | 1/5 | 230 |
|   | 0.01 | 0.01 | 460 | 1600 | 120 | 1/5 | 245 |
|   | 0.004 | 0 | 410 | 2000 | 60 |  | 342 |
| B | 0 | 0.006 | 410 | 2000 | 60 |  | 342 |
|   | 0.004 | 0.006 | 410 | 2000 | 60 |  | 365 |

TABLE VI

| No | Mass of NH$_4$ClO$_4$ / Mass of Cr$_2$O$_3$ | % of Rh | Mass of H$_3$BO$_3$ / Mass of NH$_4$ClO$_4$ | T (°C.) | P (bar) | Time (min) | Hc (Oe) |
|---|---|---|---|---|---|---|---|
| 1 | 1.5 | 0.1% | 0 | 420 | 2000 | 112 | 225 |
| 2 | 1.5 | 1% | 0 | 380 | 2000 | 60 | 370 |
| 3 | 1.5 | 0.1% | 0.2 | 430 | 2000 | 65 | 410 |
| 4 | 1.5 | 0.1% | 0.2 | 420 | 2000 | 85 | 445 |

TABLE VII

| Mass of NH$_4$ClO$_4$ / Mass of Cr$_2$O$_3$ | Mass of H$_3$BO$_3$ / Mass of NH$_4$ClO$_4$ | Mass of (COOH)$_2$ / Mass of NH$_4$ClO$_4$ | Fe (%) | Sb (%) | Te (%) | Sn (%) | Time (minutes) | Hc (Oe) |
|---|---|---|---|---|---|---|---|---|
| 2.75 | 0.12 |  |  |  |  |  | 90 | 342 |
| 2.75 | 0.11 | 0.05 | 1 | 1 |  |  | 120 | 406 |
| 2 | 0.12 |  |  |  | 2 | 2 | 90 | 475 |
| 2.75 | 0.14 | 0.05 | 2 | 1 |  |  | 120 | 477 |
| 2.75 | 0.11 | 0.05 | 1 | 1 |  |  | 90 | 483 |
| 2.4 | 0.13 | 0.05 | 2 | 2 |  |  | 135 | 485 |
| 2.5 | 0.12 | 0.14 | 5 | 8 |  |  | 100 | 490 |
| 2.3 | 0.13 |  | 2 | 2 |  | 2 | 90 | 504 |

We claim:

1. A process for obtaining, under controlled temperature and pressure reaction conditions, a ferromagnetic chromium dioxide and rhodium dioxide material in solid-solution form and having the formula $$Cr_{1-x}Rh_xO_2,$$

wherein x is a number between 0 and 0.5, the process comprising:
oxidizing a chromium oxide starting compound at a temperature of at least 350° C., under a pressure of at least 400 bars and in a reaction medium comprising:
(1) a rhodium III compound which is capable of yielding RhO$_2$ in situ under the reaction conditions and
(2) an oxidizing agent which is an oxygenated compound with an oxidation number greater than +IV and having, under said reaction conditions, a partial oxygen pressure at least equal to those, under the same reaction conditions, corresponding to the equilibria:

$$Cr_2O_3 + 0.5O_2 \rightleftharpoons 2CrO_2$$

and $$Rh_2O_3 + 0.5O_2 \rightleftharpoons 2RhO_2;$$

the chromium oxide starting compound being a member selected from the group consisting of hydrated Cr$_2$O$_3$, anhydrous Cr$_2$O$_3$ and a precursor of Cr$_2$O$_3$; and
the oxygenated compound being free from metallic cations other than chromium and not leading to the preferential or parasitic formation of chromates, of bichromates or of any other chromium compound.

2. A process according to claim 1, wherein the oxidizing is further carried out in the presence of dilution water.

3. A process according to claim 1, wherein the oxidizing is further carried out in the presence of a compound selected from the group consisting of an additional doping agent, which acts as buffer in the reaction medium, and a modifying agent.

4. A process according to claim 1, wherein the temperature is between 350° and 500° C.

5. A process according to claim 1, wherein the ratio r of the mass of chromium in the chromium oxide starting material to the mass of rhodium in the rhodium III compound is between about 5,100 and 0.50.

6. A process according to claim 1, wherein the oxidizing agent is free from metallic cations likely to produce competitive parasitic reactions and possesses sufficient oxidizing power, under the reaction conditions, to oxidize Cr III into Cr IV and RhIII in RhIV with compatible kinetics.

7. A process according to claim 6, wherein the oxidizing agent is $HXO_y \cdot zH_2O$ where X is Cl or I, y is a positive integer below or equal to 4 and z is a number representing the number of molecules of dilution water of said oxidizing agent when it is only present in solution or of dilution and of crystallization when it is in solid form.

8. A process according to claim 7 wherein y is a number within the approximate range of from 3 to 40.

9. A process according to claim 6 wherein the oxidizing agent is $HClO_4 \cdot zH_2O$ (where z is a number in the approximate range of from 3 to 40), $HIO_3$, $HIO_4 \cdot 2H_2O$, $HBrO_3$, $HBrO_3$, $HNO_3$, $NH_4ClO_4$ or $Cr(IO_3)_3 \cdot x'H_2O$ (where x' is a number from 0 to 8, which represents the degree of hydration of the chromium III iodate).

10. A process according to claim 1 wherein x is at most 0.01.

11. A process according to claim 1 wherein the rhodium III compound is a hydrate.

12. A process according to claim 11, wherein the rhodium III compound is $Rh_2O_3 \cdot 5H_2O$ or $RhCl_3 \cdot 4H_2O$.

13. A process according to claim 1 wherein:
the chromium oxide starting compound is hydrated chromium III oxide ($Cr_2O_3 \cdot ''H_2O$, where x'' is a number from 1 to 6);
the rhodium III compound is a hydrate;
the oxidizing agent is a chromium III iodate {$Cr(IO_3)_3 \cdot x'H_2O$, where x' is from 0 to 8};
the reaction medium comprises water;
the reaction temperature is between about 490° and 540° C.; and
the reaction pressure is from about 2,400 to 4,000 bars.

14. A process according to claim 13 wherein the rhodium III compound is $Rh_2O_3 \cdot 5H_2O$ or $RhCl_3 \cdot 4H_2O$.

15. A process according to claim 13, wherein the reaction pressure is about 3000 bars.

16. A process according to claim 13, wherein water in the reaction medium has a mass which is from about 1.5 to 2 times that of the oxidizing agent.

17. A process according to claim 13, wherein the chromium oxide starting compound and the rhodium III compound together have a number of chromium and rhodium atoms which is between 5 and 6 times that of chromium atoms in the oxidizing agent.

18. A process according to claim 1 wherein:
the chromium oxide starting compound is anhydrous chromium oxide, $Cr_2O_3$;
the rhodium III compound is a hydrate;
the reaction medium is an aqueous liquid solution of $HClO_y$, where y is below or equal to 4;
the reaction temperature is above 360° C.; and
the reaction pressure is above 400 bars.

19. A process according to claim 18, wherein the rhodium III compound is $Rh_2O_3 \cdot 5H_2O$ or $RhCl_3 \cdot 4H_2O$.

20. A process according to claim 19 wherein the reaction medium is an aqueous medium in which $HClO_4$ is the oxidizing agent.

21. A process according to claim 20 wherein the aqueous reaction medium contains from 15 to 70 percent by weight of pure perchloric acid as the oxidizing agent.

22. A process according to claim 21 wherein the aqueous reaction medium contains from 20 to 22 percent by weight of pure perchloric acid as the oxidizing agent.

23. A process according to claim 18 wherein the reaction medium comprises an aqueous perchloric acid solution which has 33 percent by weight of pure perchloric acid and a mass which is at least 1.4 times the sum of that of chromium in the anhydrous chromium oxide, $Cr_2O_3$, and that of rhodium in the rhodium III compound.

24. A process according to claim 1 wherein:
the chromium oxide starting compound is anhydrous or hydrated $Cr_2O_3$;
the rhodium III compound is a hydrate;
the oxidizing agent is ammonium perchlorate, $NH_4ClO_4$; and
the reaction medium is aqueous.

25. A process according to claim 24, wherein the rhodium III compound is $Rh_2O_3 \cdot 5H_2O$ or $RhCl_3 \cdot 4H_2O$.

26. A process according to claim 24, wherein the reaction pressure is about 500 bars.

27. A process according to claim 24, wherein water in the reaction medium has a mass which is about twice that of the oxidizing agent, $NH_4ClO_4$.

28. A process according to claim 24 wherein the ammonium perchlorate has a mass which is at least 2.4 times the sum of that of chromium in the chromium oxide starting compound and that of rhodium in the rhodium III compound.

29. A process which comprises: (a) preparing finely-divided ammonium bichromate, (b) thermally decomposing the finely-divided ammonium bichromate to produce anhydrous chromium oxide, $Cr_2O_3$, and (c) oxidizing the anhydrous chromium oxide, $Cr_2O_3$, as the chromium oxide starting compound according to the process of claim 1.

30. A process according to claim 29, which comprises preparing the finely divided ammonium bichromate by grinding, spraying or freeze-drying.

31. A process according to claim 29 wherein:
the rhodium III compound is a hydrate;
the oxidizing agent is of the formula $HXO_y$ (where X is Cl, Br, I or N; and y is an integer which is less than or equal to 4); and
the reaction temperature is in excess of 360° C.

32. A process according to claim 31 wherein the reaction medium is an aqueous solution of bromic acid, $HBrO_3$, which is the oxidizing agent.

33. A process according to claim 32, wherein the aqueous solution of bromic acid contains from about 15 to 20 percent by weight of pure acid.

34. A process according to the claim 31, wherein the oxidizing agent is $HIO_3$ or $HIO_4 \cdot 2H_2O$.

35. A process according to claim 34, wherein the reaction medium comprises water of dilution.

36. A process according to claim 35, wherein water in the reaction medium has a mass which is from 1 to 3 times that of the oxidizing agent.

37. A process according to the claim 31, wherein the reaction medium comprises an aqueous solution of $HNO_3$.

38. A process according to the claim 37, wherein the aqueous solution of $HNO_3$ contains from 15 to 100 percent by weight of pure acid.

39. A process according to claim 31 wherein the reaction medium comprises an aqueous perchloric acid solution which has 33 percent by weight of pure perchloric acid and a mass which is at least 1.4 times the sum of that of chromium in the anhydrous chromium oxide, $Cr_2O_3$, and that of rhodium in the rhodium III compound.

40. A process according to claim 31 wherein the oxidizing agent is iodic acid, $HIO_3$, and the reaction medium contains an amount thereof having a mass which is from 1 to 3 times the sum of that of chromium in the ammonium bichromate and that of rhodium in the rhodium III compound.

41. A process according to claim 31 wherein the oxidizing agent is periodic acid, $HIO_4 \cdot 2H_2O$, and the reaction medium contains an amount thereof having a mass which is about 3 times the sum of that of chromium in the ammonium bichromate and that of rhodium in the rhodium III compound.

42. A process according to claim 31, wherein the reaction medium is aqueous and the oxidizing agent is a ⅓ aqueous nitric acid solution having a mass which is at least 3 times the sum of that of chromium in the ammonium bichromate and that of rhodium in the rhodium III compound.

43. A process according to claim 29 wherein:
the rhodium III compound is a hydrate;
the oxidizing agent is ammonium perchlorate, $NH_4ClO_4$; and
the reaction pressure is about 500 bars.

44. A process according to claim 43 wherein the ammonium perchlorate has a mass which is at least 2.4 times the sum of that of chromium in the chromium oxide starting compound and that of rhodium in the rhodium III compound.

45. A process according to claim 1, wherein the reaction medium comprises at least one additional doping agent, which acts as buffer in said reaction medium.

46. A process according to claim 45, wherein the reaction medium comprises at least one additional doping agent which does not enter directly into the reaction but, under reaction conditions, is adsorbed on forming crystals and retards their growth.

47. A process according to claim 45, wherein the additional doping agent comprises at least one member selected from the group consisting of boric acid and oxalic acid.

48. A process according to claim 45, wherein the additional doping agent has a mass which ranges from about 0.03 to 0.6 times that of the oxidizing agent.

49. A process according to claim 48, wherein the additional doping agent further comprises oxalic acid, the oxalic acid has a mass which is between about 0.03 and 0.20 times that of the oxidizing agent, and the oxidizing agent is substantially ammonium perchlorate.

50. A process according to claim 45, wherein the additional doping agent is boric acid, the oxidizing agent is ammonium perchlorate, and the boric acid has a mass which is around 0.13 times that of the ammonium perchlorate.

51. A process according to claim 45, wherein the reaction medium comprises at least one modifying element selected from the group consisting of Fe, Sb, Te and Sn.

52. A ferromagnetic solid solution of the formula $$Cr_{1-x}Rh_xO_2$$

wherein x is a number between about 0.0001 and 0.5.

53. A ferromagnetic material which consists essentially of a solid solution according to claim 52.

54. A ferromagnetic material according to claim 53 and wherein x is a number from about 0.001 to 0.5.

55. A ferromagnetic material according to claim 53, wherein x is at most about 0.01.

56. A ferromagnetic material according to claim 53, wherein x is about 0.001.

57. A product according to claim 53, which further comprises at least one other modifying agent.

58. A ferromagnetic material according to claim 57, wherein said other modifying agent is at least one member selected from the group consisting of Fe, Sb, Te and Sn.

59. A magnetic recording element which consists essentially of a non-magnetic substrate having on it a ferromagnetic material according to claim 53.

* * * * *

UNITED STATES PATENT AND TRADEMARK OFFICE
CERTIFICATE OF CORRECTION

PATENT NO. : 4,311,770

DATED : January 19, 1982

INVENTOR(S) : Gérard DEMAZEAU, Patrick MAESTRO, Théophile PLANTE, Michel POUCHARD and Paul HAGENMULLER It is certified that error appears in the above-identified patent and that said Letters Patent are hereby corrected as shown below:

Column 19, line 7, "in" should read --into--; line 21, "$HBrO_3$, $HBrO_3$" should read --$HBrO_3$--; line 32, "$CR_2O_3 \cdot$"$H_2O$" should read --$CR_2O_3 \cdot x$"$H_2O$--.

Signed and Sealed this

Tenth Day of August 1982

[SEAL]

Attest:

GERALD J. MOSSINGHOFF

Attesting Officer

Commissioner of Patents and Trademarks